United States Patent
Blumenschein et al.

(10) Patent No.: US 8,255,963 B2
(45) Date of Patent: Aug. 28, 2012

(54) SYSTEM AND METHOD FOR MONITORING VIDEO DATA

(75) Inventors: Steven Blumenschein, Laurel, MD (US); Philip F. Young, IV, Greenbelt, MD (US)

(73) Assignee: XOrbit Inc., Columbia, MD (US)

( * ) Notice: Subject to any disclaimer, the term of this patent is extended or adjusted under 35 U.S.C. 154(b) by 1155 days.

(21) Appl. No.: 11/789,793

(22) Filed: Apr. 25, 2007

(65) Prior Publication Data

US 2007/0261073 A1 Nov. 8, 2007

Related U.S. Application Data

(60) Provisional application No. 60/794,751, filed on Apr. 25, 2006.

(51) Int. Cl.
H04N 7/10 (2006.01)
H04N 7/025 (2006.01)
H04N 7/173 (2011.01)

(52) U.S. Cl. ............ 725/107; 725/32; 725/119

(58) Field of Classification Search ............ None
See application file for complete search history.

(56) References Cited

U.S. PATENT DOCUMENTS

| | | | |
|---|---|---|---|
| 6,032,019 A * | 2/2000 | Chen et al. | 725/124 |
| 6,288,739 B1 * | 9/2001 | Hales et al. | 348/14.07 |
| 6,295,541 B1 * | 9/2001 | Bodnar et al. | 707/203 |
| 6,449,719 B1 | 9/2002 | Baker | |
| 6,880,115 B2 | 4/2005 | Abraham et al. | |
| 6,965,993 B2 | 11/2005 | Baker | |
| 7,007,170 B2 | 2/2006 | Morten | |
| 7,043,473 B1 | 5/2006 | Rassool et al. | |
| 7,150,045 B2 | 12/2006 | Koelle et al. | |
| 7,165,175 B1 | 1/2007 | Kollmyer et al. | |
| 7,284,255 B1 * | 10/2007 | Apel et al. | 725/18 |
| 7,392,037 B2 * | 6/2008 | Qi et al. | 455/410 |
| 7,565,537 B2 * | 7/2009 | Morais et al. | 713/169 |
| 2005/0038794 A1 * | 2/2005 | Piersol | 707/100 |

OTHER PUBLICATIONS

Sarkis Abrahamian, EIA-608 and EIA-708 Closed Captioning, 2003.

* cited by examiner

*Primary Examiner* — Mark D Featherstone

(74) *Attorney, Agent, or Firm* — Whiteford, Taylor & Preston L.L.P.

(57) ABSTRACT

A system and method for real-time monitoring of programming content transmission over a broadcast network. The identification and analysis of data embedded within a broadcast signal allows a broadcaster to determine whether or not their content is actually being broadcast over the network as intended. The embedded data may include various information and indicators, such as proprietary tags, included in the signal. Real-time monitoring may occur across single or multiple channels, narrow or wide geographic areas, be based on various demographic or other characteristics, and may be monitored by content providers or others.

16 Claims, 6 Drawing Sheets

SYSTEM AND METHOD FOR MONITORING VIDEO DATA

CROSS REFERENCE TO RELATED APPLICATION

This application is based upon and claims benefit of U.S. Provisional Patent Application Ser. No. 60/794,751 entitled "System and Method for Monitoring Video Data", filed with the U.S. Patent and Trademark Office on Apr. 25, 2006 by the inventors herein, the specification of which is incorporated herein by reference.

FIELD OF THE INVENTION

The present invention generally relates to the field of communications signal transmission, and particularly to a system and method for monitoring television signals being transmitted across a television network.

BACKGROUND OF THE INVENTION

The broadcasting industry includes broadcasting stations/networks that produce content or through other means acquire the right to broadcast television programs from various medias, such as video tape, digital video discs, and the like. Typically, through the use of satellite signals, this content is transmitted as specific channels to various primary receivers, such as local stations, cable systems, and other single or multichannel video programming distributors, including Multiple-Systems Operators ("MSO's"), such as COMCAST, ADELPHIA, TIME-WARNER, etc. From these primary receivers, the broadcast signal is re-transmitted/re-broadcast to secondary receivers, such as individual consumers (i.e., cable subscribers) with television antennas or receivers.

Television signals include the video and audio components of a channel or channels that contain programming content (e.g., TV shows). The signals are transmitted to primary receivers and then re-transmitted to secondary receivers and appear to display fully integrated moving pictures with sound. The television signal can also transmit auxiliary metadata in addition to the video and audio, such as (by way of non-limiting example) specific identifiers for the broadcasting station or local station/cable provider (such as the network name and/or call letters), the title for the particular program content being transmitted or re-transmitted, video fingerprints and/or watermarks, VChip data including parental content advisories, ATVEF triggers for interactive television programming, closed captioning data, teletext, and various other indicators and/or data as may be contemplated by those of ordinary skill in the art. For domestic NTSC television signals, this metadata is often encoded on video line 21 in accordance with the EIA 608 specification.

Various indicators/identifiers/markers have been used for signal monitoring to identify the programming content within a transmitted signal. For instance, watermarks (e.g., visible, audible or hidden code) may be inserted into the video data that is later filtered out as a signal marker by a monitoring system. The watermark may be used to identify the source of particular video content and/or the nature of the content itself. This facilitates confirmation of the broadcast to ensure that the signal sent was received intact at the remote end.

Watermarks and other signal monitoring tools may be helpful, for example, inc confirming compliance with Federal regulations, such as those promulgated by the Federal Communications Commission (FCC). For instance, the FCC investigates complaints presented by consumers. These complaints may involve a range of issues, such as missing closed captioning, inaccurate program ratings, content deemed indecent, and so on. To investigate such complaints, the FCC may try to obtain a copy of the video. If the consumer cannot provide the video, the FCC may contact the local primary receiver and/or broadcast network. Upon obtaining a copy of the video, the FCC makes a determination regarding the content of the video and attempts to identify the offending producer and broadcaster for possible sanctioning. Watermarks and other embedded metadata within the signal may allow the FCC, broadcasting station(s), and other entities to identify the owner or producer of the video program and who transmitted and/or re-transmitted the program.

Typically, watermarks are inserted into the video data prior to the distribution of the signal. Unfortunately, it may be the case that the inclusion of various indicators, such as a watermark, within a television signal may require the expenditure of resources (i.e., time and money) for their creation and implementation within the signal. Such expenditures, such as monies and/or space within the transmission signal for the indicator, may become onerous for the party tasked with creating and implementing them (typically the content provider). The utilization of space within the available video data by a watermark may modify the video signal, something most broadcasters may not want to occur. Still further, if every transmitted signal must contain some form of indicator, the costs may rapidly escalate. The overall process can be very expensive and time consuming.

In fact, the costs of including the watermark indicators may be prohibitive. Further, there may be signals that are transmitted without such an identifier in place or the signal may contain an unrecognizable identifier. Such situations may provide a signal that is not able to be effectively monitored by the broadcasting station. This inability to monitor a broadcast signal may impact the promotional capabilities to advertisers and syndicators and possibly expose the broadcasting station to FCC sanctions for rules violation.

Many video distributors or MSO's may prefer if certain information was not able to be verified through the use of watermarks or other indicators/identifiers/marks. It is common for MSO's agreements with broadcasting stations/networks not to allow a watermark to be inserted without prior knowledge and a commercially available method for removing the mark. As MSO's could extract additional income by, for instance, replacing certain content intended for distribution with other content (such as local advertising, or simply alternate video content), an MSO may have a direct interest in removing or damaging watermarks if possible, thus circumventing the watermark process and rendering it worthless. This has, unfortunately, been the practice of some primary receivers/re-transmitters (local stations or cable providers). These primary receivers may transmit their own programming content to consumers, which the broadcasting stations have not produced or authorized transmission of. Such programming content may violate federal regulations, and for enforcement/sanctions purposes, the FCC may assume that the broadcast station(s) is liable. In order to defend against the FCC, the broadcasting station(s) will draw attention to the absence of their watermark(s) in the offending video. However, as previously mentioned, this may not be possible because MSO's can strip the watermarks from all the content per their agreements so that the missing watermark is not exculpatory.

Moreover, in the broadcasting industry, revenue for the content providers (i.e., broadcasting stations) may be typically generated through: (1) sale of advertising time within programming content; or (2) syndication of programming content. Thus, broadcasters may generate revenue by broadcasting specific content in specific geographic regions at specific times, and selling advertising time in those broadcasts to third party advertisers, and syndicated programs to local primary receivers (e.g., local television stations or cable systems). Unfortunately, ensuring that such content (i.e., program content and advertising content) is being broadcast as intended has been problematic. Efforts to monitor the broadcasting of content have either not been made or have tasked consumers with recording programming at specified times and then asked the consumers to then forward the recording to a third party. The third party compares the broadcast with a printed "playlist" of what the broadcaster intended and contracted to be broadcast. The procedure requires much manual activity and is very vulnerable to human error. Further, the process often takes weeks to complete, thereby not allowing for real-time monitoring.

Therefore, it would be desirable to provide a system and method through which the signal transmitted by broadcasting stations may be monitored in real-time to ensure that it is being re-broadcast to and in particular received by consumers. Further, it would be desirable to provide a system and method capable of monitoring in real-time a broadcast signal without a particular identifier, such as a watermark. It would be desirable to provide a broadcast signal capable of monitoring that does not require modification (i.e., inclusion of a watermark) prior to broadcast.

It would also be desirable to provide real-time monitoring of broadcast signals in various geographically disparate regions regardless of content being broadcast. It would be further desirable to provide real-time monitoring of broadcast signals to promote increased enforcement capabilities by the broadcasting station(s) against primary receivers who are failing to honor their contractual obligations by substituting their own content. It would still be further desirable to provide real-time monitoring of broadcast signals that promotes compliance with agreements made with third parties, such as MSO's.

SUMMARY OF THE INVENTION

Accordingly, a system and method are provided for real-time monitoring of a broadcast signal being transmitted by a broadcasting entity, such as a broadcasting station, by monitoring existing data embedded within the video signal. In accordance with one aspect of a particularly preferred embodiment, data embedded within the video signal may be monitored whether or not such data has been specifically placed there for identification purposes (such as a watermark). Such system and method allows for the real-time monitoring of signals being broadcast and then re-broadcast over a television broadcasting system. Such a system and method may preferably log the occurrence of missing content (an "incidence") in a re-broadcast signal and notify the user (i.e., broadcasting station) of the occurrence. Such a system and method may promote compliance with FCC rules by allowing the broadcasting station(s) to monitor their broadcast signal. This may also help to reduce expenditure of resources on the creation and implementation of specialized identifiers for the tracking of broadcast signals.

In accordance with another aspect of a particularly preferred embodiment, such system and method may promote advertising and syndication management by the broadcasting station(s). More particularly, content delivery may be monitored from any location for content providers and others, such as advertisers who wish to ensure that their advertisements are being displayed as and where intended. Thus, accountability and verification within the entire broadcasting network of signal transmission may be improved.

Moreover, such system and method may be implemented to provide monitoring capabilities to selected geographic areas or markets, whether a nationwide network or defined market.

It is desirable to provide the real-time monitoring capability without interference with the transmission of the signal. Thus, with regard to another aspect of a particularly preferred embodiment, the system and method herein do not interfere with the transmission of the signal, and do not cause delays in the signal, skips, pauses, or any other transmission interrupts that may affect the quality of the signal being transmitted. Further, it is desirable that such system and method preclude the possibility of MSO's defeating the verification by somehow altering the signal.

Monitoring may also be provided in an active mode, in which proprietary tags are inserted upstream of the MSO. The proprietary tags may be created and included within any portion of line 21 of the video signal and their presence or absence in a transmission may be monitored in real-time.

Preferably the user is able to review in real-time the monitored signal broadcasts. The reviewing capability may be provided, for example, as a stand alone functional feature, web-enabled user interface, or other electronic delivery methods, such as a customized software application. However, as constant monitoring may not be feasible, an alert may be generated by the system and sent to the user when an "incident" or "event" occurs.

Preferably, a user may monitor a single channel or multiple channels. The system and method may allow users to set the level at which they are alerted by modifying the level of signal mismatch that determines the alert.

A record may be maintained of statistics for multiple time frames, such as daily or weekly, and may allow the user to look at statistics for previous days or weeks.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
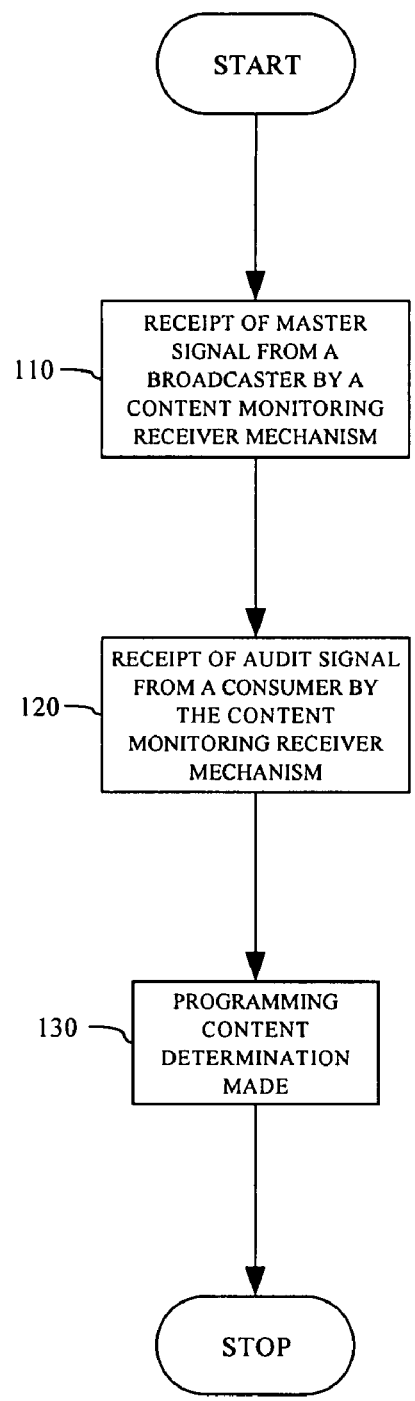
FIG. 1 is an illustration of a method for real-time monitoring of broadcast content in accordance with an exemplary embodiment of the present invention.

A method 100 for real-time monitoring of broadcast content is shown in FIG. 1. In a preferred embodiment, the method is a set of executable steps that may be implemented by a computing system (information handling system). However, alternative embodiments for implementation of the method of the current invention are contemplated and within the scope of the present invention.

In a first step 110, a broadcast signal is received by a content monitoring receiver mechanism from a broadcasting station (a.k.a., content provider). The broadcast signal may be, by way of non-limiting example, a television broadcast signal. The content monitoring receiver mechanism may receive a single or multi-channel television broadcast signal. Alternatively, the content monitoring receiver mechanism may receive a signal from more than one broadcasting station. The signal includes the programming content (i.e., TV shows, commercials, movies, and the like) being broadcast by the broadcasting station. The broadcasting station may comprise various sources, such as a television network, cable network, or other third party sources, such as a production studio or as contemplated by those of ordinary skill in the art. For example, the broadcasting station may be a television network whose transmission signal is broadcast to and received by various entities whom may be located geographically proximal to one another or geographically disparate, such as primary receivers (i.e., local broadcast stations and cable providers) who then re-broadcast the signal to individual subscribers (i.e., consumers) either for free or as part of a paid programming package agreement (e.g., cable TV package).

In a second step 120 a signal from the consumer (i.e., an intended recipient of the broadcast signal) is received by the content monitoring receiver mechanism. The signal received from the consumer includes the programming content that is being received by the consumer from the primary receiver to which the consumer subscribes or is within the local broadcast network range. In a third step 130, a programming content determination is made, wherein the programming content received from the content provider is compared against the programming content received from the consumer, as described in detail below. The determination made is whether or not the programming content broadcast from the broadcasting station is the same programming content being received by the consumer.

In a preferred embodiment, the content monitoring receiver mechanism includes the capability to make the programming content determination. For example, the content monitoring receiver mechanism may be an information handling system (i.e., computing system) that is enabled to execute a comparison analysis of the programming content being received from the broadcasting station and the consumer. The computing system may accomplish this through an analysis of video data content within the signal of the programming content received from both the broadcasting station and the consumer. The video data content of the signal may be analyzed through a computational mechanism, discussed in detail below, that reviews the signal and identifies particular information within the video data of the signal. The particular information that is identified may vary and the method and system described herein may scan and identify various information contained within the video data of the signal.

Typically, video line 21 of an NTSC signal transmission over a broadcasting network, such as television and/or cable network, contains data. This may include information such as closed captioning, identification of the broadcasting station, duration of programming content, geographic locality of transmission, time of broadcast, and the like as may be contemplated by those of ordinary skill in the art. Such data is encoded in accordance with EIA 608, the specification of which is incorporated herein by reference. In a preferred embodiment, the video pixels on line 21 of each video frame are converted into a four byte representation as set forth in EIA 608, and this is used to analyze the signals received by the content monitoring receiver mechanism from the broadcasting station and consumer. For digital signals, the four bytes per frame EIA 608 stream is still present, but is embedded within the user data portion of the Digital Television bitstream. The governing standards are EIA 708 and ATSC A/53, the specifications of which are incorporated herein by reference. In an alternative embodiment, data located within any of the lines of the VBI may be scanned and analyzed, and the method and system herein may contemporaneously scan and analyze more than one line of video data contained within a signal. Similarly, this method and apparatus can be adapted to make use of the EIA 708 data streams.

With reference to a particularly preferred embodiment, and by way of summary, a "capture" system comprising both software and hardware is preferably installed at a broadcaster's facility. This system accepts an input signal (comprising both video and audio data) from each of the broadcaster's channels. Each signal is analyzed and processed to produce a continuous real-time "digest." The digest discards much if not most of the data in the input signal, but retains enough data to ensure that the digest is unique to that input. The continuous digest is periodically packetized, timestamped, and transmitted to a "compare" system that may be remote from the broadcaster's facility. Each packet is labeled so that it can be recognized as part of the "master" feed for a particular channel.

Additional capture systems may be deployed at various endpoints of interest. Typically, broadcasters will wish to verify proper transmission to at least one consumer household within each of a set of demographic markets they (or their advertisers) deem significant. These capture systems are then connected to the end-user's video source. As an example, for cable and satellite television subscribers, the input source would be the set top tuner box(es). Each endpoint capture system generates its own digests (one per channel being monitored) and transmits them to the remote compare system as outlined above. The only significant difference is that the packets are labeled to indicate that they are "audit" feeds from a specific location (and channel).

The "compare" system receives all of the various digest feeds. For a given channel, there is a single "master" feed and one or more "audit" feeds that are to be checked for accuracy. This involves taking the digest from an audit packet and locating a matching digest extracted from the master feed based on their respective timestamps (while allowing for some latency/transmission delay). Based on how well the digest feeds match up, the compare system can conclude whether or not the original signal reached the endpoint intact. All of the audit digest data are saved to an archive. Likewise, such comparison is made by comparing a portion of the broadcast signal that is native to that signal, and thus that does not require a watermark or similarly configured tag that must be added to the broadcast signal in order to detect its reception at the recipient's location. Thus, as used herein, data that is referred to as native to a signal is data that is included in the original broadcast signal and intended for reception by and potentially effecting the display of such broadcast signal to an intended recipient and/or the intended recipient's use of such signal, such as (by way of example only and not by way of limitation) closed caption data, identification of broadcasting station, duration of programming content, geographic locality of transmission, time of broadcast, and the like as contemplated by those of ordinary skill in the art.

In order to find where and when a particular advertisement has been played, the commercial is run through the same digest creation and analysis profile as is used by the capture systems. The results are then compared to the archive, and any matching digests will indicate all the endpoints where the commercial was played, and at which times.

The first challenge in implementing such a solution is to select a suitable digest. As with any hashing algorithm, the solution must strike a balance between uniqueness and complexity. In addition, the signal received by the capture system will almost certainly have slight differences from the original transmission, even when all of the equipment is functioning normally. The solution must accommodate the "normal" signal fluctuations that will arise and build in tolerance for such discrepancies; otherwise, none of the audit feeds will appear to match the master feed. For NTSC systems, one implementation is to make use of the data encoded on video line 21. The specification governing this data is EIA 608. The data consists primarily of closed captioning information along with descriptive program metadata (such as the network name, call letters, program title, program rating, and so on). There are a number of third parties who sell hardware and/or software to facilitate both encoding and decoding this data.

EIA 608 dictates that each frame of video will contain four bytes of data encoded within line 21. Although the specific details of how the four bytes are encoded within the pixels on line 21 are not germane to the instant invention, certain characteristics of this approach are noted here. Positive aspects include the fact that line 21 pixels are either black or white, so subtle variations in color will not impact the data bytes recovered from line 21, which provides a certain level of fault tolerance. Using just four bytes of data as a synopsis of an entire frame (video and audio) provides excellent compression and low complexity. At present, the FCC requires that 100% of all new programming be closed captioned, so broadcasters are already encoding this data in their signals. Also, for analog signals, there is a strong correlation between errors within the line 21 data stream and poor quality of the video picture. Each of the four bytes of data is encoded using odd parity, so whenever recovered line 21 data does not exhibit odd parity, we know that the transmitted signal was damaged, and we can be confident that the overall picture shows a corresponding level of distortion/error. Finally, the approach cannot be easily circumvented by MSO's. They are obligated to pass through the various line 21 metadata streams intact, and in any case, stripping out the EIA 608 data would be detected by this approach. Negative aspects of this approach include the fact that we can not infer anything about whether the audio was properly transmitted. Because the line 21 encoding scheme is more robust than that of the visible picture, the absence of parity errors does not necessarily imply a high quality video picture (which can exhibit significant noise before triggering parity errors). Finally, a given set of four bytes decoded from a particular frame is, by itself, not very unique to the source signal. However, the accumulation of many four byte blocks will produce an increasingly unique ordered data set tied to what was spoken (and thus captioned) as well as the distinctive markers in the metadata (for example, the broadcaster's call letters).

Alternative embodiments may formulate digests by measuring different aspects of the signal, such as the brightness levels among a particular set of pixels, or by sampling the audio at a particular frequency, or by devising metrics to summarize the location and extent of changes in the picture between consecutive video frames, or various combinations of any of these approaches. The subsequent digest comparisons may then need to institute threshold values to allow for typical signal fluctuations. For example, if we were to compare the brightness levels at a specified pixel position, and one digest had a measurement of "170" while another digest had a measurement of "164," we might decide these values were "close enough" to be considered identical in adjudicating whether the two digests match.

In order to implement the capture system, third party, commercially available line 21 recovery tools may be used that will provide the EIA 608 data stream (extracted from either an analog or digital signal). The stream is divided into Field 1 and Field 2, and each video frame contains an ordered sequence of two bytes of Field 1 data and a separate ordered sequence of two bytes of Field 2 data. Regardless of how the data is provided by the third party toolkit, the capture system should accumulate and store the data in two different logical arrays (one specifically dedicated to each field) while carefully maintaining the order in which each field's data was received. The capture system should also ensure that even when the video signal is too poor to decode all four bytes for a given frame, placeholder values are inserted/substituted to account for the otherwise missing data. An appropriate placeholder value for missing bytes is 0xFF, as it has even parity and is therefore not a valid EIA 608 value. After "enough" data has been recovered, it should be transmitted as a packet to the compare system (while preserving both the data sequencing and field assignments), along with a timestamp. Determining when "enough" data has been accumulated is somewhat arbitrary. More frequent (smaller) packets imply more overhead, while less frequent (larger) packets imply longer periods of uncertainty in determining the signal's status. For example, if a packet is only sent once every half hour, then the compare system's last snapshot will typically be rather stale. Further, should the line 21 recovery toolkit fail to supply one or more fields/frames (and in this case, we mean missing data rather than merely incorrect data), the impact on the compare algorithm is much worse the larger the packet size. (Once the packet has been sent to the compare system, the capture system can discard its local copy of that packet.) While there are many possible mechanisms to enable the capture and compare systems to communicate with each other, using TCP/IP over the internet is probably the most straightforward approach. An interval of about four seconds will yield a reasonable packet size (assuming 30 frames per second, the line 21 data alone will yield 480 bytes). The capture system would operate as a client, while the compare system would function as the server (i.e., listens on a predefined port). The compare system will need to know the "identity" of the capture systems that connect to it so that it can recognize the type of feed being provided. This can be determined as part of a login process when the connection is established, or if multiple feeds are being multiplexed over the same connection, each packet can include the requisite identifiers. These consist of a flag indicating whether the feed is the master feed from the broadcaster (vs. an audit feed from a deployed system/endpoint), a unique identifier that distinguishes one capture system from another, and lastly some sort of "channel" descriptor (example: "XYZ Network"). Including an accurate timestamp or similar identifier with each packet is critical. The capture system is preferably configured to resync its internal clock with an NTP server to ensure minimal "drift", and to simplify the compare system's task, the timestamp is preferably in UTC/GMT. The timestamp is preferably recorded at a point just prior to sending each packet.

The compare system will listen for inbound connections from the capture systems and accept them. The compare system will then begin receiving various packets containing line 21 data. Whether or not the data is multiplexed over shared connections, each packet can be thought of as belonging to a distinct logical feed, where a feed represents the data from a particular capture system and a particular channel (i.e. the "identity"). The compare system collects and stores all of the line 21 data organized based on which feed it came from. The compare system creates a storage bin for each feed, and each storage bin contains two byte arrays, one for Field 1 and one for Field 2. Thus, when a packet arrives, the compare system will first check to see if it has created a storage bin for that particular feed. If yes, then the Field 1 data from the packet is appended to the end of the Field 1 array in that storage bin, and then the Field 2 data from the packet is appended to the end of the Field 2 data in that storage bin. If the bin does not yet exist, the compare system creates a new one and dedicates it to that specific feed (only). Then the packet data is copied as before. The byte arrays can be thought of as parallel timelines where each byte represents half a video frame (1/60th of a second). In addition to the byte arrays, each storage bin contains an array of "markers". As part of the copy process, the compare system will create a new marker and append it to the marker array. The marker records the timestamp from the packet, the count of Field 1 bytes in the packet, the count of Field 2 bytes in the packet, and the offset into each byte array for that packet's data. For example, a new packet arrives with 480 bytes of data (240 for Field 1 and 240 for Field 2). Suppose the compare system checks and discovers a matching storage bin corresponding to this packet's feed, and that three packets had already been received prior to our current packet. The Field 1 array within the storage bin would already contain 720 bytes (240×3), as would the Field 2 array. The compare system would append the new packet data such that both arrays would then contain 960 bytes (240×4). It would create a new marker and assign the timestamp from the packet, Field 1 count=240, Field 2 count=240, Field 1 offset=720, Field 2 offset=720, and then append this new marker to the marker array, which should now contain four markers total. (The reason the actual counts and offsets are carefully recorded for each field of every packet is to allow for errors, so that if the capture system fails to supply all 480 bytes as expected, we adapt to what we receive, rather than assuming perfect operation). Note that the marker array and byte arrays are organized from oldest (start/top of array) to newest (end/bottom of array) since the most recent data is always appended.

The actual comparison preferably proceeds as follows. Twice a second (based on a timer), we iterate through the collection of storage bins. If the storage bin is for an audit feed, we look to see if it has any markers in its marker array. If yes, we examine the oldest marker's timestamp to decide if enough time has elapsed in order to make certain that any packet from the master feed which might be relevant to our comparison has had a chance to reach our compare system such that its data has already been assigned to the correct storage bin for that master feed. A delay of 7 seconds should more than suffice. If the audit marker is old enough, we next search our collection of storage bins to locate the corresponding master feed, if any. (We will recognize it because it will have the master flag set to "true" and have the same channel descriptor as our audit feed.) If we find the master feed, we check to see if it has managed to queue up enough history yet. We can determine this based on whether the master feed's marker array has at least 4 elements. If yes, then we have located both the audit feed storage bin and its corresponding master feed storage bin, and we're ready to compare. (If any of these preconditions fail, then that particular audit feed is skipped and we move on to the next storage bin to continue our iteration.)

The next step is to compute two deltas (one for each field) representing our best guess as to how the data in the audit feed and master feed are offset from each other in their respective storage bins. The relationships can be thought of this way:

audit=master+delta
master=audit−delta
delta=audit−master

Take the timestamp from the audit marker and scan through the master feed's marker array to locate the nearest match (in time). Then subtract each reference array offset from the corresponding audit array offset to yield the base deltas. Then subtract the reference marker's timestamp from the audit marker's timestamp, and convert this time value into half frames (units of 1/60th of a second). Subtract this value from each of the base deltas. Following is an example of delta computation:

| MASTER FEED | AUDIT FEED |
|---|---|
| time = 4.0 | time = 11.0 |
| offset 1 = 0 | offset 1 = 0 |
| count 1 = 240 | count 1 = 240 |
| offset 2 = 0 | offset 2 = 0 |
| count 2 = 240 | count 2 = 240 |
| time = 8.0 | |
| offset 1 = 240 | |
| count 1 = 240 | |
| offset 2 = 240 | |
| count 2 = 240 | |
| time = 12.0 | |
| offset 1 = 480 | |
| count 1 = 240 | |
| offset 2 = 480 | |
| count 2 = 240 | |
| time = 16.0 | |
| offset 1 = 720 | |
| count 1 = 240 | |
| offset 2 = 720 | |
| count 2 = 240 | |

The first column shows the contents of the cells in the master feed's marker array, and the second column shows the audit feed's marker that we wish to compare. To simplify the example, the above data set uses very basic time values (seconds) instead of high precision timestamps that incorporate the current date. The nearest match to the audit feed's timestamp is the third element in the master array. Thus, for Field 1, the position difference is 0−480=−480. Next, the time difference is 11.0–12.0=–1.0, which translates to –60 half frames. Therefore, the base delta for Field 1 is: –480 – –60 = –420.

We would then run through the same calculations using the Field 2 values (which in this example happen to be the same as Field 1).

These values are only a starting point for the comparison, however. This is because the timestamps sent to the content monitoring receiver by the capture systems can not take into account the transmission latency. At the broadcaster's facility, the master feed should receive the video input with virtually no delay, but as the signal traverses all of the intervening relay systems to reach the consumer's household, a significant delay can accrue (up to a few seconds). For this reason, the compare system will normally receive the master feed data before the audit feeds report in (the only case when this is not true is when network/bandwidth issues delay the master feed's TCP/IP connection more than the audit feed connections).

Two passes are made, one for each field. Each pass involves an outer loop and an inner loop. The outer loop controls how many attempts will be made to find an exact match. In other words, if the base delta (first guess) does not yield a perfect match, this loop controls how many more deltas will be applied before giving up. This value should be based on the worst case scenario for latency. If the largest known transmission delay for the current channel is, for example, 2 seconds, then that would imply a search window of 120 attempted deltas (2 seconds=120 half frames). This should be padded slightly to account for any TCP/IP delays and/or clock drift. The inner loop simply performs a byte byte comparison of all of the audit marker's array data (for the current field) to the corresponding master data and keeps track of how many times they match.

To continue with the example from above, the first pass (for Field 1) would begin the outer loop with the delta –420. The inner loop would then iterate 240 times, because the audit marker encapsulates 240 bytes of Field 1 data. The audit marker indicates that the starting offset for Field 1 data is 0, so the comparison will begin from that point in the audit feed's Field 1 array. This is compared to the master feed's Field 1 array, and to calculate the offset, we apply the relationship master=audit–delta, and then add the current iterator value. Thus, for the first delta, the inner loop would generate the following comparisons:

audit (Field 1) [0]=master (Field 1) [420] ? (0 – –420+0)
audit (Field 1) [1]=master (Field 1) [421] ? (0 – –420+1)
audit (Field 1) [2]=master (Field 1) [422] ? (0 – –420+2) . . . and so on.

If at the end of the inner loop, all of the comparisons succeeded (i.e. all 240 bytes were identical), then an exact match has been found for Field 1. Otherwise, the delta is incremented to –419 for the next outer loop attempt, and process is repeated, keeping track of which delta produces the best results. For the second pass, the same process is used, but using the Field 2 delta and arrays. If a delta is located for each field where all (or nearly all) the comparisons succeed, then confidence exists that the 4 second block of data was received correctly (how much confidence depends on how much captioning data was present at that time). By combining the results from multiple blocks over the course of several minutes, one can attain a high degree of confidence in the signal's integrity (good or bad).

When we no longer have need of a marker and its associated array data, we can delete them (moving the newer elements up). However, it is first necessary to adjust the offset values to reflect the new array positions. In our example, if we delete the first marker and the first 240 bytes from both the Field 1 and Field 2 arrays in the master feed, all the remaining offset values (in this feed) should have 240 subtracted from them. Thus, the first marker's data offsets will once again be zero. The timer routine can also act as a "garbage collector" to dispose of unused and/or old data. For example, if an audit feed is connected but the master feed is not, the audit data should be discarded. Similarly, the master feed preferably retains not more than four marker's worth of data, so the oldest data should be purged periodically.

There are a number of optimizations that are possible. If there is a known minimum transmission latency, this can be added to the first guess delta to save comparison loops. It is possible to abandon a particular delta if a point is reached when it can no longer best the results of a previously attempted delta. For example, if we've already found a delta that matched 220 of 240 bytes, and our current delta has only matched 9 of its first 30 comparisons, the remaining comparisons should be skipped. Also, early candidate deltas should be clustered around the initial one, both before and after, rather than incrementing only. In our example, instead of the outer loop incrementing from –420 down to –300, the progression should be –420, –419, –421, –418, –422 (and so on) until about one third of the total attempts have been devoted to alternating this way. This allows the audit feed data to arrive sooner than the timestamps predict, rather than only later. In addition, it is possible to remember the best deltas from the previous block and try those first on the next block. Preferably, the toolkit used to extract the EIA 608 stream shall provide the data in a timely fashion, such that the 240 bytes of Field 1 data are taken from the very same video frames as the 240 bytes of Field 2 data, or are offset by no more than a couple of frames. For example, if the Field 1 data for a given packet were decoded from frames #720-#959, then the Field 2 data for that packet should be derived from those same frames, or perhaps be slightly delayed (say, #722-#961). Under normal circumstances, this correlation implies that the two comparison deltas should always be within four (half) frames of each other, so having determined the best delta for Field 1 limits the possible Field 2 deltas to a large degree, saving computational effort.

In order to be able to search the data for a particular ad, the system may save all of the raw line 21 data received, then run the ad through a program to extract its binary line 21 data, and finally perform a linear scan for matching data (very similar to the process outlined above). Another alternative is to decode the caption text (using EIA 608), decorate it with timestamps to indicate when it was received, save the text to a file, and then index the file with a third party full text engine. This avoids the problem whereby the ad has no XDS metadata (network name, call letters, etc.), but this data was inserted by various broadcasters when the commercial was played, so the line 21 output is not expected to match the original input.

From the description provided above, it may be seen that the programming content determination step of method 100 preferably comprises the step of making the programming content determination automatically. The content monitoring receiver mechanism may analyze the information received form the broadcasting station and consumer, and automatically determine whether or not the programming content corresponds with one another. Alternatively, the programming content determination step of method 100 may comprise the step of making the programming content determination manually. The content monitoring receiver mechanism may provide the information received from the broadcasting station and consumer and allow manual determination of whether or not the programming content corresponds with one another.

Method 100 may comprise a step of outputting a result of the determination made. The output may include display upon a display screen of the content monitoring receiver mechanism. Alternatively, the output step may include communicating the determination made to another destination, such as another computing system or device. This communication may occur over a network, such as the Internet, LAN, WAN, and the like. The communication of the output may comprise communicating to destinations outside of the system, as described below. The output may be formatted and/or re-formatted in various ways to increase the compatability of the information being sent to various final destinations, such as converting the information from a word processing format to a .pdf format. Other re-formatting as contemplated by those of ordinary skill in the art may be accomplished by the present invention.

Figure 2:
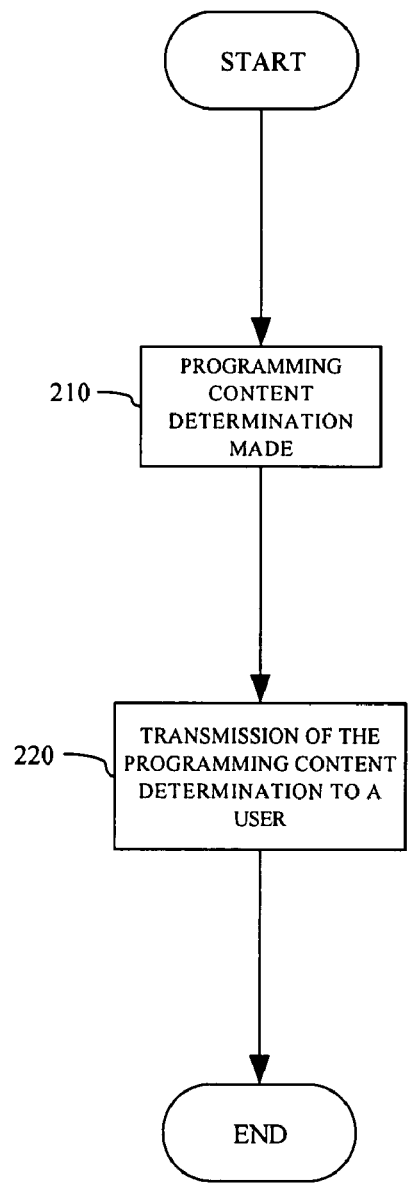
FIG. 2 is an illustration of a method for providing a programming content determination in accordance with an exemplary embodiment of the present invention.

A method 200 of providing a programming content determination to a user is shown in FIG. 2. In step 210 a programming content determination is made based on a comparison of programming content information received from a broadcasting station and a consumer of the programming content. As described above, this programming content determination may be made using various devices, such as a content monitoring receiver mechanism, other computing system, or even manually. The programming content determination is then transmitted to a user, in step 220. The transmission may occur manually, through use of a computing system, or utilizing various other communication technologies. It is further contemplated that the programming content determination may be sent to a third party, such as a broadcasting station(s), the FCC, or others.

Figure 3:
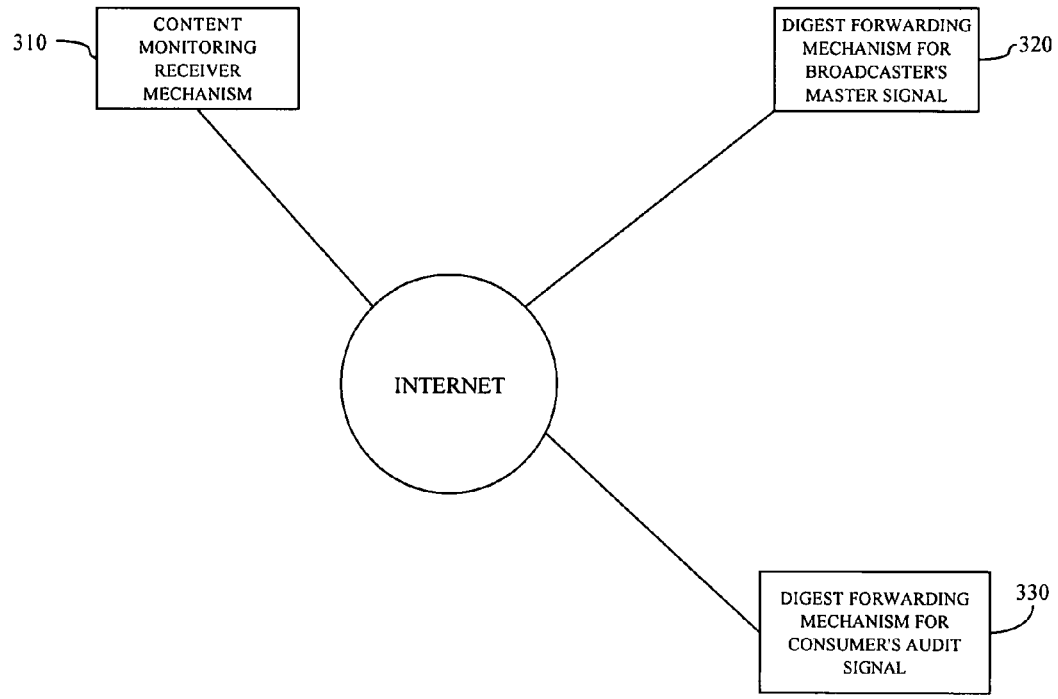
FIG. 3 is an illustration of a system upon which the method of FIGS. 1 and 2 may be implemented.

With regard to another aspect of a preferred embodiment of the invention, and with reference to FIG. 3, a system 300 for making a programming content determination includes a content monitoring receiver mechanism 310 communicatively coupled with a digest forwarding mechanism 320 for a broadcaster's master signal and a digest forwarding mechanism 330 for a consumer's audit signal. These three exemplary components of system 300 may be communicatively coupled using various technologies, such as wireless communications technology, Bluetooth technology, serial cable, and the like. The network may be constructed as a LAN or WAN, or the Internet.

Figure 4:
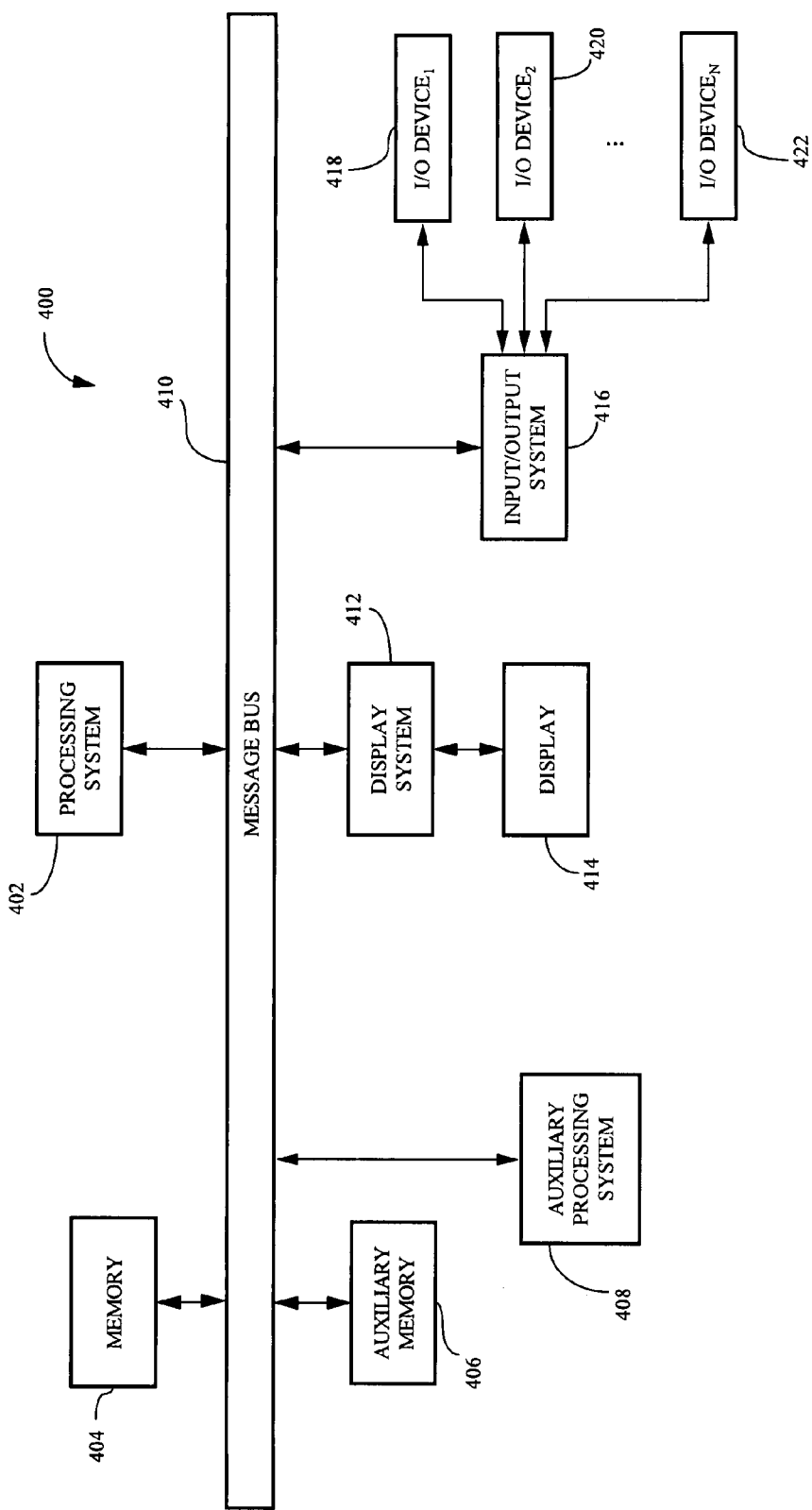
FIG. 4 is an illustration of a representative hardware system for an information handling system which may be employed as part of the system and for execution of the methods of the current invention.
Figure 5:
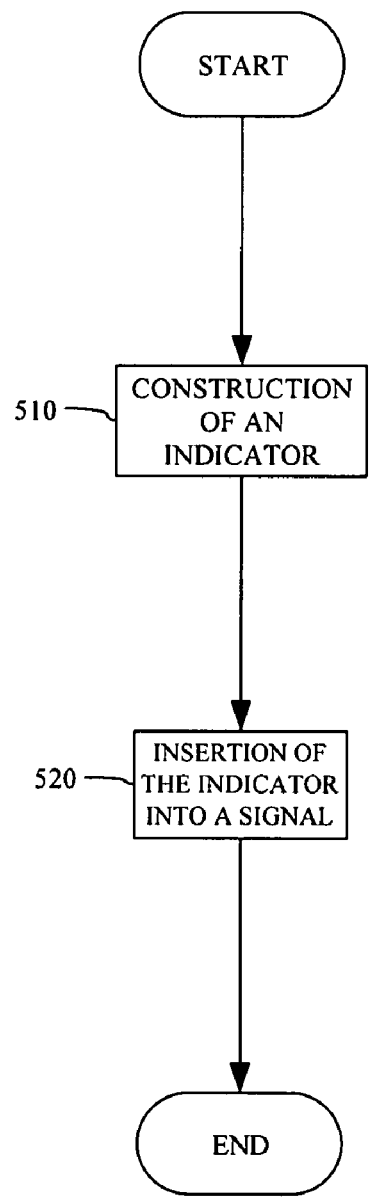
FIG. 5 is an illustration of a method for creating and placing an identifiable content indicator within a broadcast signal.
Figure 6:
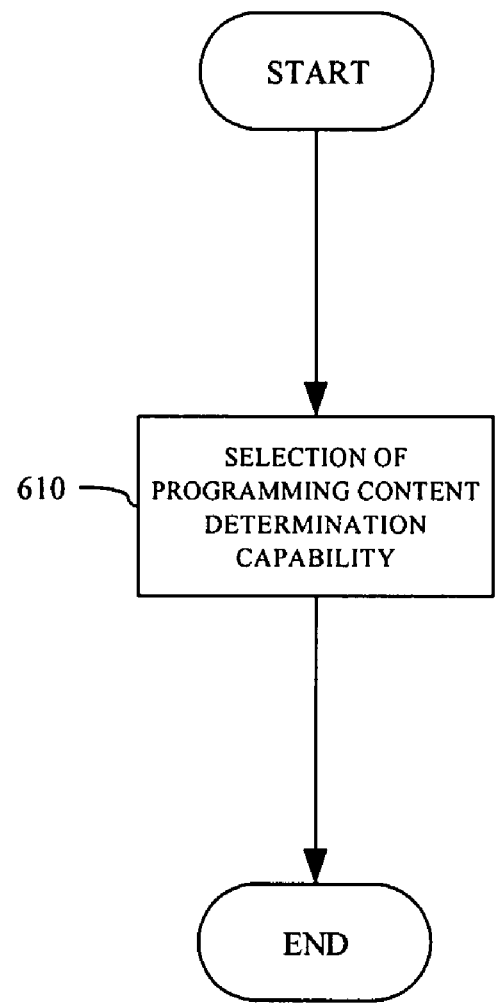
FIG. 6 is an illustration of a method for promoting advertising and syndication management.

In a preferred embodiment, the content monitoring receiver mechanism 310 is enabled as a computing system. An exemplary hardware system generally representative of the computing (information handling) system suitable for use as a content monitoring receiver mechanism, as previously discussed, is shown schematically in FIG. 4. A central processing system 402 controls the hardware system 400. A central processing unit such as a microprocessor or microcontroller for executing programs is included in the central processing system 402 for the performance of data manipulations and controlling the tasks of the hardware system 400. A system bus 410 provides the communication with the central processor 402 for transferring information among the components of the hardware system 400. Facilitating information transfer between storage and other peripheral components of the hardware system may be a data channel that may be included in bus 410. Further, the set of signals required for communication with the central processing system 402 including a data bus, address bus, and control bus is provided by bus 410. It is contemplated that any state of the art bus architecture according to promulgated standards may be utilized for bus 410, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

A main memory 404 and auxiliary memory 406 (including an auxiliary processing system 408, as required) may be provided. The storage of instructions and data for programs executing on the central processing system 402 is provided by main memory 404. Typically semiconductor-based memory such as dynamic random access memory (DRAM) and/or static random access memory (SRAM) is used for the main memory 404. However, main memory 404 may utilize other semi-conductor-based memory types, such as synchronous dynamic random access memory (SDRAM), Rambus dynamic random access memory (RDRAM), ferroelectric random access memory (FRAM), and so on. The storage of instructions and data that are loaded into the main memory 404 before execution is provided by auxiliary memory 406. The storage capabilities provided by the auxiliary memory 406 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). Alternatively, a variety of non-semiconductor-based memories, including but not limited to floppy disk, hard disk, magnetic tape, drum, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and other varieties of memory devices as contemplated may be used for auxiliary memory 406.

Auxiliary processors of the auxiliary processing system 408, which are discrete or built into the main processor, may be included in hardware system 400. These auxiliary processors may be used as a digital signal processor (a special-purpose microprocessor having an architecture suitable for fast execution of signal processing algorithms), as a back-end processor (a slave processor subordinate to the main processing system), as an additional microprocessor or controller for dual or multiple processor systems, or as a coprocessor. They may also be used to manage input/output and/or to perform floating point mathematical operations.

A display system 412 for connecting to a display device 414, wherein the display system 412 may comprise a video display adapter having all of the components for driving the display device, including video memory, buffer, and graphics engine as desired, is included in hardware system 400. Video memory may be, for example, windows random access memory (WRAM), video random access memory (VRAM), synchronous graphics random access memory (SGRAM), and the like. The display device 414 may comprise a cathode ray-tube (CRT) type display such as a monitor or television, or an alternative type of display technology such as a projection-type CRT display, a light-emitting diode (LED) display, a gas or plasma display, an electroluminescent display, a vacuum fluorescent display, a cathodoluminescent (field emission) display, a liquid-crystal display (LCD) overhead projector display, an LCD display, a plasma-addressed liquid crystal (PALC) display, a high gain emissive display (HGED), and so forth.

An input/output (I/O) system 416 for connecting to one or more I/O devices 418, 420, and up to N number of I/O devices 422 is included in hardware system 400. Interface functions between the one or more I/O devices 418-422 may be provided by various controllers or adapters. I/O devices such as a keyboard, mouse, trackball, touchpad, joystick, trackstick, infrared transducers, printer, modem, RF modem, bar code reader, charge-coupled device (CCD) reader, scanner, compact disc read-only memory (CD-ROM), digital versatile disc (DVD), video capture device, touch screen, stylus, electroacoustic transducer, microphone, speaker, and others may be communicatively coupled by various interface mechanisms, such as universal serial bus (USB) port, universal asynchronous receiver-transmitter (UART) port, serial port, IEEE 1394 serial bus port, infrared port, network adapter, parallel port, printer adapter, radio-frequency (RF) communications adapter, and others. Analog or digital communication capabilities between the hardware system 400 and the input/output system 416 and I/O devices 418-422 may be provided for communication with external devices, networks, or information sources. Preferably industry promulgated architecture standards are implemented by system 416 and I/O devices 418-422, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It is to be understood that modification or reconfiguration of the hardware system 400 of FIG. 4 by one having ordinary skill in the art would not depart from the scope or the spirit of the present invention.

The communicative coupling of the content monitoring receiver with the program content provider broadcasting mechanism and the consumer programming content broadcasting mechanism allows for the programming content determination to be made. The content monitoring receiver, continuously, at any time, or at specified times, receives programming content information from the program content provider broadcasting mechanism and the consumer programming content broadcasting mechanism. As discussed in greater detail above, the programming content information is a record of the programming content that is being transmitted from the program content provider broadcasting mechanism or transmitted to the consumer programming content broadcasting mechanism. The content monitoring receiver is capable of allowing for the comparison and determination of programming content from the two sources.

In a preferred embodiment, the program content provider broadcasting mechanism and the consumer programming content broadcasting mechanism are computer devices each having one or more video capture devices and capable of digitizing video for analysis purposes. The computers include a storage device, such as a hard drive, for recording information when required and a communications mechanism (i.e., Ethernet port or others) for transmitting data to another computing device, such as those described above for the content monitoring receiver. The computer devices of the program content provider broadcasting mechanism and the consumer programming content broadcasting mechanism may optionally not include any user interface capabilities or devices, such as a keyboard, mouse, or display screen.

In a preferred embodiment, the consumer programming content broadcasting mechanism includes a video tuning board, which allows the device to receive at least a single video signal and tune up to twelve various channels (digital or analog). It is contemplated that more than twelve channels may be tuned by the device.

In an alternate embodiment, the system may include a first and a second content monitoring receiver communicatively coupled with the program content provider broadcasting mechanism and the consumer programming content broadcasting mechanism, respectively. In such a system, the first and second content monitoring receivers may be individually enabled to identify the programming content by scanning and analyzing the video data from the signal being received. This information may then be communicated to a secondary device which then compares the programming content information received and makes the programming content determination. Alternatively, the first and second content monitoring receivers may identify and copy the relevant identifying data in the signal, or a portion thereof, and pass on that information. The information may be communicated to a secondary device where it is analyzed and then the determination is made. In another embodiment, the first and second content monitoring receivers may be in communication with one another. Each may perform the scan and analysis of the video data and then either the first or the second content monitoring receiver may be capable of making the determination of whether or not the programming content received from both signal transmission sources correspond.

In another embodiment of the current invention, a method 500 for creating and placing an identifiable content indicator within a video signal transmission is provided. In a preferred embodiment, the content indicator is a proprietary tag that is assigned to and linked with a customer and their content. The proprietary tag may be inserted into line 21 data or other lines of the VBI. The proprietary tag may be retrieved from a storage device/location and the customer is preferably a content provider or broadcaster. The proprietary tag assignment to a particular customer is maintained as an accessible record within the system. The proprietary tag may include information regarding the time of transmission, geographic location, and the like as previously described. The customer is allowed to encode their signal with the tag or a completed encoded signal may be distributed to the customer. Because the system is capable of receiving all data in the signal and comparing at least all line 21 data, the proprietary tag may be identified, recorded, and then compared against the assignment records. Alternatively, the recorded tag may be stored for later searching of the assignment records. The system may allow the customer to be notified of the time the signal with their tag was received and in what region or other relevant information as may be determined by the customer. The notification may be generated automatically by the system or may be manually created. The transmission of the notification may occur utilizing any of the previously described communications technologies.

In a first step 510 an indicator is constructed. In a preferred embodiment, the construction may be of a digital content indicator which is computer readable and capable of being downloaded and transmitted over a television or cable transmission network. Alternatively, the construction may be of a non-digital content indicator. The digital content indicator may be variously constructed, such as a tag, watermark, password, icon, logo, symbols, and the like.

In step 520 the content indicator is inserted within the content (signal) that is to be transmitted. The inclusion of the content indicator may occur through the transmission of the content indicator over a network to the creator of the content. The creator of the content may transfer the content indicator into the information contained on the medium upon which the content is contained. For instance, the creator of a television show may store the show upon a digital storage medium (i.e., DVD, CD-ROM, or other digital memory storage devices as are known by those of skill in the art) in anticipation of it being sent to a broadcast station for transmission over a television or cable network. Before the creator of the show sends it for transmission over the network the creator may download a content indicator created by the current invention onto the show content. The download may occur directly from a network, over which the content indicator has been provided, or from a storage media upon which the content indicator has been stored and may be accessed.

The indicator (i.e., proprietary tag) may be inserted into the signal as an XDS or other tag by the content creator. The insertion of the tag may occur as a time of air process or through a post production captioning process.

In an alternative embodiment, the second step may be accomplished by the communication of the show content to a provider of the content indicator by the show producer. The communication of the show content may be accomplished using various technologies, such as the transmission of the content over a network, sending of a storage media upon which the show content is stored, and other communication mechanisms and devices as contemplated by those of ordinary skill in the art. Thus, before the television show content is sent to the broadcast network for transmission it may first be sent to the content indicator provider for inclusion of the content indicator within the show content. After the content indicator is inserted within the show content (signal) it may then be communicated back to the show producer or to a content provider, such as a television network, for broadcast.

In an embodiment of the content indicator, an encryption coding may be included within the content indicator. In a preferred embodiment, the encryption coding may be an encrypted sequence of information within the content indicator. It is contemplated that the encryption coding may encompass the entire content indicator or may encrypt less than the entire content indicator. Alternatively, the encryption coding may be an additional amount of information connected to or included with the content indicator.

In another embodiment of the current invention, a method 600 is provided for promoting advertising and syndication management by the content provider. In step 610, a content provider selects the real-time programming content determination capabilities to monitor and report on the broadcasting of its content to individual consumers. As discussed above, this real-time monitoring provides the content provider with a clear indication of how faithfully their broadcasted programming content is being re-broadcast to consumers.

In this and previous embodiments, the method and system may be enabled to provide channel statistics for one or more time frames, such as hourly, daily or weekly, and even allow the user to look at statistics for previous days or weeks. This will give the user measurable results with which to provide verification to existing and potential advertisers and/or syndicators of the re-broadcasting to consumers of the content that the user is transmitting.

After step 610, the user may optionally present to an advertiser and/or syndicator a promotional or syndication opportunity. This opportunity may include a showing of the statistics that verify the faithfulness of re-broadcast experienced for the show or shows being considered. With this data, the user may gain a competitive advantage over others and may generate advertising and syndication revenue as a result.

The method 600 may comprise the step of providing a real-time display of the programming content determination of the present invention. Thus, the user, such as the advertiser and/or syndicator, is allowed to receive confirmation that the intended content is being delivered as anticipated. In a preferred embodiment, this confirmation is received by the user in a real-time/instantaneous manner. In an alternative embodiment, the user receives their confirmation at a later time which may be determined by the user.

It is further contemplated that the system and method described herein may provide monitoring capabilities based on various characteristics. For instance, monitoring may be tied to selected geographic areas or markets and may be implemented on a nationwide basis. For instance, the system and method may be implemented to monitor a particular city, county, state, region, and the like. An identified market may include a particular age range, economic profile, or other indicators. The system and method may also provide monitoring of international broadcasting, and of any combination of characteristics without departing from the scope of the present invention.

In the above described methods and systems, it is to be understood that the current invention preferably provides real-time monitoring of a video signal being transmitted/re-transmitted, and preferably without interrupting the signal. Thus, such methods and systems are optimally configured to avoid interfering with the transmission of the signal and to avoid delays, skips, pauses, or any other transmission interrupts that may affect the quality of the signal being transmitted.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

We claim:

1. A method for use in real-time monitoring of programming content transmitted over a broadcast signal, comprising the steps of:

providing a content monitoring receiver computer configured to receive a broadcast signal from at least one broadcasting station and a rebroadcast signal from at least one consumer;

receiving at said content monitoring receiver computer a broadcast signal from a broadcasting station, wherein said broadcast signal comprises first programming content transmitted by said broadcasting station and intended for delivery to at least one intended consumer of said broadcast signal, said first programming content having a first subject matter;

receiving at said content monitoring receiver computer at least one rebroadcast signal from said at least one intended consumer of said broadcast signal, wherein said rebroadcast signal comprises second programming content received by said at least one intended consumer of said broadcast signal, said second programming content having a second subject matter;

causing said content monitoring receiver computer to compare at least a portion of said broadcast signal to at least a portion of said rebroadcast signal, wherein said portion of said broadcast signal comprises signal data that is native to said broadcast signal; and based upon a result generated in said comparing step, causing said content monitoring receiver computer to determine whether a third party has replaced said first subject matter with said second subject matter by determining whether said second programming content differs from said first programming content beyond a predetermined threshold.

2. The method of claim 1, further comprising the step of:
causing said content monitoring receiver computer to notify a user of the occurrence of the existence of a difference between said first programming content and said second programming content beyond said predetermined threshold.

3. The method of claim 1, further comprising the step of:
causing said content monitoring receiver computer to create a digest of said broadcast signal and a digest of each rebroadcast signal, wherein each of said digests comprises a plurality of timestamped data packets, and wherein said comparing step further comprises causing said content monitoring receiver computer to compare data packets of said digest of said broadcast signal with data packets of each said digest of each rebroadcast signal based upon associated timestamps of each of said data packets.

4. The method of claim 3, further comprising the step of causing said content monitoring receiver computer to output an indication of a discrepancy between data packets of said digest of said broadcast signal and associated data packets of each said digest of each rebroadcast signal, which discrepancy exceeds said predetermined threshold.

5. The method of claim 3, wherein said timestamped data packets from said broadcast signal further comprise data encoded on line 21 of a Vertical Blanking Interval of said broadcast signal, and wherein said timestamped data packets from said rebroadcast signal further comprise data encoded on line 21 of a Vertical Blanking Interval of said rebroadcast signal.

6. The method of claim 3, wherein said timestamped data packets from said broadcast signal further comprise data collected from line 21 of a Vertical Blanking Interval of multiple frames of said broadcast signal, and said timestamped data packets from said rebroadcast signal further comprise data collected from line 21 of a Vertical Blanking Interval of multiple frames of said rebroadcast signal.

7. The method of claim 3, wherein said comparing step further comprises:
causing said content monitoring receiver computer to collect data packets in broadcast signal data storage bins and rebroadcast signal data storage bins;
causing said content monitoring receiver computer to determine a transmission time associated with transmission of a rebroadcast signal data packet;
causing said content monitoring receiver computer to search broadcast signal data storage bins to locate a broadcast signal data packet corresponding to an oldest rebroadcast signal data packet;
causing said content monitoring receiver computer to compute a timestamp offset between transmission of said rebroadcast signal data packet and said corresponding broadcast signal data packet; and
causing said content monitoring receiver computer to compare a plurality of rebroadcast signal data packets with a plurality of broadcast signal data packets having timestamps that are offset from said plurality of rebroadcast signal data packets by said timestamp offset.

8. The method of claim 6, wherein each of said timestamped data packets is received by TCP/IP transmission.

9. In a video distribution network in which programming content is transmitted over a master broadcast signal distributed from a content producer to a plurality of rebroadcasters, said rebroadcasters transmitting a rebroadcast signal to intended consumers, a system for confirming that a subject matter of programming content within said rebroadcast signal matches a subject matter of programming content within said broadcast signal, the system comprising:

a content monitoring receiver computer configured for the reception of data from a plurality of programming content data transmitters, said content monitoring receiver computer having executable computer code stored thereon adapted to:
receive a broadcast signal from a broadcasting station, wherein said broadcast signal comprises first programming content transmitted by said broadcasting station to at least one intended consumer of said broadcast signal, said first programming content having a first subject matter;
receive at least one rebroadcast signal from said at least one intended consumer of said broadcast signal, wherein said rebroadcast signal comprises second programming content received by said at least one intended consumer of said broadcast signal, said second programming content having a second subject matter;
compare at least a portion of said broadcast signal to at least a portion of said rebroadcast signal, wherein said portion of said broadcast signal comprises signal data that is native to said broadcast signal; and
based upon a result generated by a comparison of said portion of said broadcast signal to said portion of said rebroadcast signal, determine whether a third party has replaced said first subject matter with said second subject matter by determining whether said second programming content differs from said first programming content beyond a predetermined threshold.

10. The system of claim 9, said executable computer code being further adapted to:
notify a user of the occurrence of the existence of a difference between said first programming content and said second programming content beyond said predetermined threshold.

11. The system of claim 9, said executable computer code being further adapted to:
create a digest of said broadcast signal and a digest of each rebroadcast signal, wherein each of said digests comprises a plurality of timestamped data packets, and wherein said executable computer code adapted to compare at least a portion of said broadcast signal to at least a portion of said rebroadcast signal is further adapted to compare data packets of said digest of said broadcast signal with data packets of each said digest of each rebroadcast signal based upon associated timestamps of each of said data packets.

12. The system of claim 11, said executable computer code being further adapted to output an indication of a discrepancy between data packets of said digest of said broadcast signal and associated data packets of each said digest of each rebroadcast signal, which discrepancy exceeds a predetermined threshold.

13. The system of claim 11, wherein said timestamped data packets from said broadcast signal further comprise data encoded on line 21 of a Vertical Blanking Interval of said broadcast signal, and wherein said timestamped data packets from said rebroadcast signal further comprise data encoded on line 21 of a Vertical Blanking Interval of said rebroadcast signal.

14. The system of claim 11, wherein said timestamped data packets from said broadcast signal further comprise data collected from line 21 of a Vertical Blanking Interval of multiple frames of said broadcast signal, and said timestamped data packets from said rebroadcast signal further comprise data collected from line 21 of a Vertical Blanking Interval of multiple frames of said rebroadcast signal.

15. The system of claim 11, wherein said executable computer code adapted to compare at least a portion of said broadcast signal to at least a portion of said rebroadcast signal further comprises executable computer code adapted to:
   collect data packets in broadcast signal data storage bins and rebroadcast signal data storage bins;
   determine a transmission time associated with transmission of a rebroadcast signal data packet;
   search broadcast signal data storage bins to locate a broadcast signal data packet corresponding to an oldest rebroadcast signal data packet;
   compute a timestamp offset between transmission of said rebroadcast signal data packet and said corresponding broadcast signal data packet; and
   compare a plurality of rebroadcast signal data packets with a plurality of broadcast signal data packets having timestamps that are offset from said plurality of rebroadcast signal data packets by said timestamp offset.

16. The system of claim 14, wherein each of said timestamped data packets is received by TCP/IP transmission.

\* \* \* \* \*